United States Patent [19]
Sather

[11] 3,761,699
[45] Sept. 25, 1973

[54] MULTIPLICATION BY SUCCESSIVE ADDITION WITH TWO'S COMPLEMENT NOTATION

[75] Inventor: Delaine C. Sather, Cedar Rapids, Iowa

[73] Assignee: Collins Radio Co., Dallas, Tex.

[22] Filed: Mar. 28, 1972

[21] Appl. No.: 238,905

[52] U.S. Cl. .......... 235/165, 235/164
[51] Int. Cl. .......... G06f 7/52
[58] Field of Search .......... 235/164, 165, 167

[56] References Cited

UNITED STATES PATENTS

| | | | |
|---|---|---|---|
| 3,627,999 | 12/1971 | Iverson | 235/164 |
| 3,489,888 | 1/1970 | Wilhelm | 235/164 |
| 3,519,809 | 7/1970 | Iverson et al. | 235/164 |

OTHER PUBLICATIONS

I. Flores, The Logic of Computer Arithmetic, Prentice-Hall, Inc. 1963, p. 244
L. Y. Liv & M. W. Bee, "Multiplication Using 2's Complement Numbers", IBM Tech. Disclosure Bulletin Vol. 9 No. 2 July 1966 pp. 171–173

*Primary Examiner*—Charles E. Atkinson
*Assistant Examiner*—David H. Malzahn
*Attorney*—Bruce C. Lutz et al.

[57] ABSTRACT

A multiplying circuit for serial bit words wherein a number of word times equal to the number of bits in the multiplier is required to perform the full multiplication operation. Each bit of the multiplier from the least significant to the most significant is multipled by the multiplicand word individually and after each multiplication the result is added to the previous product divided by 2. If the last or sign bit of the multiplier indicates that is is a negative word, the multiplication at this last word time produces the negative equivalent of the multiplicand which is the last digital word added to produce the final answer. Additional circuitry is utilized for forcing the cumulative product after division by 2 to have a sign bit corresponding to the sign bit of the multiplicand after the occurrence of a logic 1 in a significant bit of the multiplier.

4 Claims, 2 Drawing Figures

Figure 1:
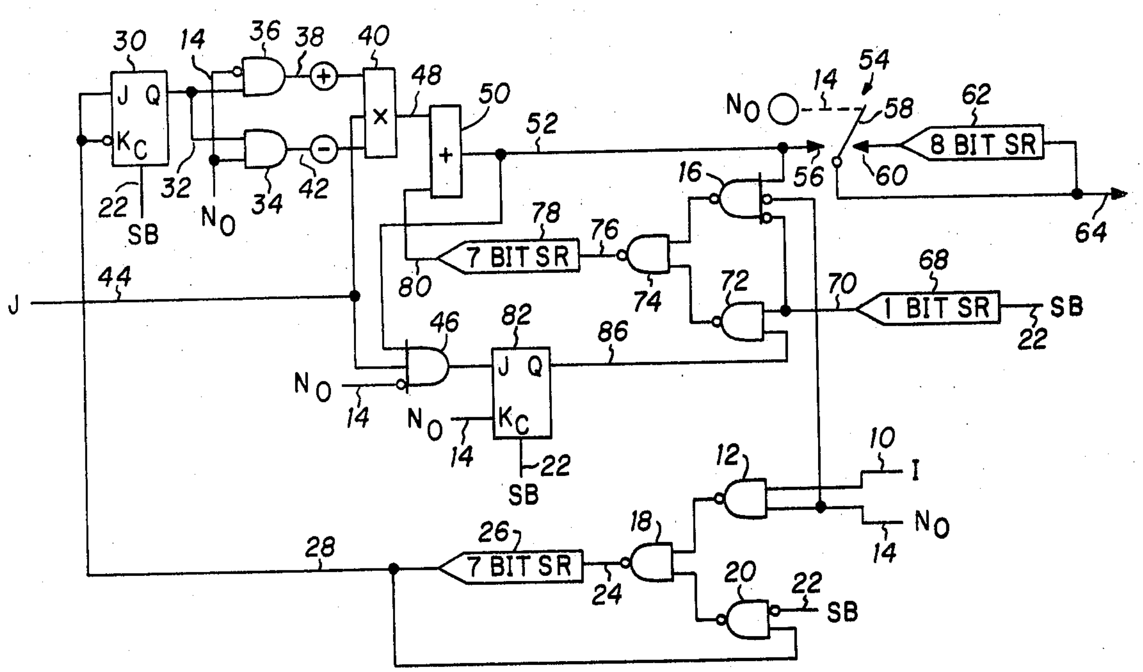

| | $N_0$ | $N_1$ | $N_2$ | $N_3$ | $N_4$ | $N_5$ | $N_6$ | $N_7$ | $N_0$ | |
|---|---|---|---|---|---|---|---|---|---|---|
| 14' | 11111111 | 00000000 | 00000000 | 00000000 | 00000000 | 00000000 | 00000000 | 00000000 | 11111111 | |
| 22' | 00000001 | 00000001 | 00000001 | 00000001 | 00000001 | 00000001 | 00000001 | 00000001 | 00000001 | |
| 24' | 11101110 | 11011100 | 10111000 | 01110000 | 11100000 | 11000000 | 10000000 | 00000000 | | |
| 28' | 1 | 11011101 | 10111001 | 01110000 | 11100001 | 11000001 | 10000001 | 00000000 | 0000000 | |
| 38' | | 11111111 | 11111111 | 11111111 | 00000000 | 11111111 | 11111111 | 11111111 | 00000000 | |
| 42' | | 00000000 | 00000000 | 00000000 | 00000000 | 00000000 | 00000000 | 00000000 | 00000000 | |
| 44' | | 10110010 | 10110010 | 10110010 | 10110010 | 10110010 | 10110010 | 10110010 | 10110010 | |
| 48' | | 10110010 | 10110010 | 10110010 | 00000000 | 10110010 | 10110010 | 10110010 | 00000000 | |
| 80' | | 00000000 | 01100100 | 10011100 | 11000010 | 10000100 | 11101100 | 01000010 | 11100010 | |
| 52' | | 10110010 | 11001110 | 01100001 | 11000010 | 01110110 | 00100001 | 11110001 | 11100010 | 64' |
| 76' | 0000000 | 00110010 | 01001110 | 01100001 | 01000010 | 01110110 | 00100001 | 01110001 | 0 | |
| 44' | | 11001101 | 11001101 | 11001101 | 11001101 | 11001101 | 11001101 | 11001101 | 11001101 | |
| 48' | | 11001101 | 11001101 | 11001101 | 00000000 | 11001101 | 11001101 | 11001101 | 00000000 | |
| 80' | | 00000000 | 10011011 | 01100011 | 00111101 | 01111011 | 00010011 | 10111101 | 00011101 | |
| 52' | | 11001101 | 00110001 | 10011110 | 00111101 | 10001001 | 11011110 | 00001110 | 00011101 | 64' |
| 76' | 0000000 | 01001101 | 10110001 | 10011110 | 10111101 | 10001001 | 11011110 | 10001110 | 1 | |
| 24' | 10010001 | 00100010 | 01000100 | 10001000 | 00010000 | 00100000 | 01000000 | 10000000 | | |
| 28' | 1 | 00100010 | 01000100 | 10001001 | 00010000 | 00100000 | 01000000 | 10000001 | 0000000 | |
| 38' | | 11111111 | 00000000 | 00000000 | 11111111 | 00000000 | 00000000 | 00000000 | 00000000 | |
| 42' | | 00000000 | 00000000 | 00000000 | 00000000 | 00000000 | 00000000 | 00000000 | 11111111 | |
| 44' | | 10110010 | 10110010 | 10110010 | 10110010 | 10110010 | 10110010 | 10110010 | 10110010 | |
| 48' | | 10110010 | 00000000 | 00000000 | 10110010 | 00000000 | 00000000 | 00000000 | 11001101 | |
| 80' | | 00000000 | 01100100 | 11001000 | 10010000 | 11010100 | 10101000 | 01010000 | 10100000 | |
| 52' | | 10110010 | 01100100 | 11001000 | 01101010 | 11010100 | 10101000 | 01010000 | 00011101 | 64' |
| 76' | 0000000 | 00110010 | 01100100 | 01001000 | 01101010 | 01010100 | 00101000 | 01010000 | 0 | |
| 44' | | 11001101 | 11001101 | 11001101 | 11001101 | 11001101 | 11001101 | 11001101 | 11001101 | |
| 48' | | 11001101 | 00000000 | 00000000 | 11001101 | 00000000 | 00000000 | 00000000 | 10110010 | |
| 80' | | 00000000 | 10011011 | 00110111 | 01101111 | 00101011 | 01010111 | 10101111 | 01011111 | |
| 52' | | 11001101 | 10011011 | 00110111 | 10010101 | 00101011 | 01010111 | 10101111 | 11100010 | 64' |
| 76' | 0000000 | 01001101 | 10011011 | 10110111 | 10010101 | 10101011 | 11010111 | 10101111 | 1 | |

FIG. 2

MULTIPLICATION BY SUCCESSIVE ADDITION WITH TWO'S COMPLEMENT NOTATION

THE INVENTION

The present invention is directed generally to electronics and more specifically to a circuit for providing serial bit word multiplication times another serial bit word each of which represents a binary number.

The present invention utilizes readily available components to provide a simple multiplication circuit for serial bit words. The components utilized are further expanded upon in my pending application, Ser. No. 225,443 filed in the Patent office 11 February, 1972 and, entitled "Integration and Filtration Circuit Apparatus" and assigned to the same assignee as the present invention. The teachings of this referenced patent application are hereby incorporated by reference into the present disclosure for a more complete presentation.

While other types of multipliers have been disclosed in the prior art, and in fact multipliers may be found in the referenced application, the prior art multipliers either used a different approach, such as in the referenced application, or they were considerably more complicated and as a result more expensive to build and repair. The present invention, however, utilizes a minimum of parts each of which is readily obtainable.

The present invention utilizes a pair of word storage means or shift registers each of which has one bit less capacity than the words to be multiplied. By applying the multiplier to one of these shift registers and then recirculating the word, the output at a given sampled time in a word time is progressively each bit of the multiplier word from the least significant to the most significant over a period of word times equivalent to that of the number of bits in the multiplier word. This information can be utilized to set a JK flip-flop for a full word time with the output of the flip-flop being used to drive a word time multiplying circuit. If the multiplicand is then applied also to the word time multiplying circuit, an output will be obtained when the multiplier bit is a logic 1 and no output will be obtained when the multiplier bit is a logic 0. The multiplied product can then be accumulated in a second word storage means and added to the cumulative product in the second word storage means after each multiplication. By making the second word storage means of a capacity one bit less than the multiplicand, the product is divided by a factor of 2 each word time after the least significant bit of the product is eliminated to maintain the original serial bit word length. While this does affect the accuracy of the product, the errors involved are minimal. The last multiplication operation operates in the normal manner if the multiplier is a positive number thereby having its most significant bit (MSB) as a logic 0. If the multiplier is a negative number and the MSB is a logic 1, the multiplicand is converted to its negative equivalent and added to the thus far accumulated product divided by 2. Thus, the problem of cumulative product sign is automatically taken care of. The output product is stored in a shift register equivalent to the multiplicand word length upon the completion of each cumulative multiplication action or in other words once each frame of word times. A frame as defined herein is the time required for passage of a number of words equivalent to the number of bits in a word.

It is thus an object of the present invention to provide serial bit word multiplying apparatus.

Other objects and advantages of the present invention will be apparent from a reading of the specification and appended claims in conjunction with the drawings wherein:

FIG. 1 is a block circuit diagram illustrating a preferred embodiment of the invention; and FIG. 2 is a chart illustrating the words in binary serial bit format to be found at various points in the circuit for each word time of a frame.

In the circuit a first input 10 is utilized to supply the multiplier word. Input 10 may also be labeled I. Input 10 is connected to a NAND gate 12 having a second input of 14. Input 14 is also labeled $N_0$. $N_0$ indicates that this lead is activated only during the first word time of each frame. Input 14 is also connected to an inverting input of a NAND gate 16. An output of NAND gate 12 is connected to an input of a NAND gate 18 having a second input provided by a NAND gate 20. NAND gate 20 has an input from a sync bit lead 22 which may be further labeled SB and which is inverted before application to NAND gate 20. An output of NAND gate 18 appears on lead 24 and is connected to an input of a 7 bit shift register 26. An output of shift register 26 appears on a lead 28 which is connected to a second input of NAND gate 20 and also to a J input of a JK flip-flop 30. Lead 28 is also inverted and applied to the K input of JK flip-flop 30. The sync bit lead 22 is applied to the clock input of JK flip-flop 30 and the true or Q output of JK flip-flop 30 is connected via a lead 32 to inputs of a pair of AND gates 34 and 36. The $N_0$ input 14 is connected to a further input of AND gate 34 and to an inverted input of AND gate 36. An output of AND gate 36 is connected to a plus lead 38 which is further connected to a similar input of a multiplier 40. An output of AND gate 34 is designated as 42 and is connected to a minus lead of multiplier 40. An input lead 44, which is further designated as J, provides the multiplicand input for each word of a frame of multiplication except that it commences after the cessation of the application of the multiplier word. The lead 44 is connected to a multiplying input of multiplier 40 and to an input of an AND gate 46. AND gate 46 also has the $N_0$ input lead 14 connected thereto and inverted before application. An output of multiplier 40 is designated as 48 and is connected to a first input of a summing means 50. Summing means 50 in this case performs an addition of inputs. An output of summing means 50 is designated as 52 and is connected as a further noninverting input to AND gate 46. Lead 52 is also supplied as a noninverting input to NAND gate 16. Finally, lead 52 is supplied to a switch generally designated as 54 and to a contact 56 thereof. Switch 54 has a movable pole 58 which is alternated between contacts 60 and 56 in accordance with application of power from lead 14. In other words, the movable pole of 58 normally contacts contact 60 except when a signal $N_0$ is supplied on lead 14 during the first word of each frame. In the position shown, contact 60 is connected to the output of a shift register 62 whose input is connected to the pole 58 and to an apparatus output 64.

A sync bit input which occurs simultaneously with the sign bit (MSB) of each word is designated as 22 and is delayed one bit time in a shift register 68 before being supplied on an output lead 70 to an inverting input of NAND gate 16 and to a noninverting input of NAND gate 72. The outputs of NAND gate 16 and 72 are supplied to inputs of a NAND gate 74 whose output is supplied on a lead 76 to a 7 bit shift register 78. An output of shift register 78 is supplied on lead 80 to a second input of summing means 50. An output of AND gate 46 is supplied to a J input of a JK flip-flop 82 which receives an $N_0$ input on a lead 14 at a K input thereof and which receives a sync bit input on the clock input via a sync bit lead 22. An output of JK flip-flop 82 is provided on a lead 86 at the Q or true output thereof to a further input of NAND gate 72.

FIG. 2, as indicated above, illustrates the serial digital words in each word time of a frame. A frame may be defined as the total time between the first occurrence of a bit in word $N_0$ and the occurrence of the first bit in the next $N_0$ word. However, the frame may commence with any other bit of a given word in the multiplication process and end at the similar bit at the same step in the next multiplication process. During this time, for an 8 bit serial word, there are 8 word time periods. As illustrated, the multiplier word I appears on lead 10 and is transmitted to lead 24 in the first word time period $N_0$. The $N_0$ application to NAND gate 16 assures that the last seven bits of the first word stored in shift register 78 will be logic 0. As will be explained later, the application of a sync bit on lead 22 to one bit delay 68 controls the logic value of the bit appearing on lead 76 for the least significant bit or first bit time of the word $N_0$.

As will be apparent from the description thus far, the various rows of FIG. 2 are designated by primed numbers equal to that used for designation in FIG. 1.

Two of the rows illustrate the logic value of the inputs $N_0$ and SB or sign bit which appear on leads 14 and 22 respectively.

As will be noted, FIG. 2 is divided into six main groups of rows other than the inputs 14' and 22'. The first three groups of rows represent two multiplication problems and the last three represent two multiplication problems. As illustrated, the input I is the same for each of the first two multiplication problems while the value of J changes from a positive number to a negative number in the two multiplication problem examples. These two multiplication problems are illustrated in the more typical multiplication format as problems No. 1 and No. 2 where the fractional binary words are shown with the least significant bit to the right.

| Problem #1 | | Problem #2 | |
|---|---|---|---|
| J=+77/128 | 01001101 | J=−77/128 | 10110011 |
| I=+119/128 | 01110111 | I=+119/128 | 01110111 |
| | 00000000 | | 00000000 |
| | 01001101 | | 10110011 |
| | 001001101 | | 110110011 |
| | 01001101 | | 10110011 |
| | 001110011 | | 110001100 |
| | 01001101 | | 10110011 |
| | 010000110 | | 101111001 |
| | 00000000 | | 00000000 |
| | 001000011 | | 110111100 |
| | 01001101 | | 10110011 |
| | 001101110 | | 110010001 |
| | 01001101 | | 10110011 |
| | 010000100 | | 101111011 |
| | 01001101 | | 10110011 |
| | 010001111 | | 101110000 |
| | 00000000 | | 00000000 |
| | 01000111 1001011 | | 10111000 0110101 |
| | JI=+71/128 | | JI=−72/128 |

The second set of rows of FIG. 2 utilizes the negative value of the number appearing on lead 24 for each of the third and fourth multiplication problems. As before the value of the number appearing on lead 44 is changed from its positive to negative version. The more normal presentation of multiplication problems 3 and 4 of FIG. 2 are illustrated as problems No. 3 and No. 4.

| Problem #3 | | Problem #4 | |
|---|---|---|---|
| J=−77/182 | 01001101 | J=−77/128 | 10110011 |
| I=−119/128 | 10001001 | I=−119/128 | 10001001 |
| | 00000000 | | 00000000 |
| | 01001101 | | 10110011 |
| | 001001101 | | 110110011 |
| | 00000000 | | 00000000 |
| | 000100110 | | 111011001 |
| | 00000000 | | 00000000 |
| | 000010011 | | 111101100 |
| | 01001101 | | 10110011 |
| | 001010110 | | 110101001 |
| | 00000000 | | 00000000 |
| | 000101011 | | 111010100 |
| | 00000000 | | 00000000 |
| | 000010101 | | 111101010 |
| | 00000000 | | 00000000 |
| | 000001010 | | 111110101 |
| | 10110011 | | 01001101 |
| | 10111000 0110101 | | 01000111 1001011 |
| | J=−72/128 | | JI=+71/128 |

Examining multiplication problem No. 1, it will be noted that the first multiplication product on line 4 is added to a plurality of zeros on line 3. The use of the plurality of zeros in line 3 is merely to conform with the method of opreration of the multiplier of the present invention. As will be realized, the addition of zero to the product does not in any way affect the answer. Also, in conformity with the operation of the present multiplier and the desire to keep the resultant or cumulative answer to have the same total number of logic bits as the multiplier and multiplicand words, the least significant bit has been dropped on each muliplication step. Thus, the cumulative product on line 19 of the problem has the eight most significant bits enclosed by a rectangular box and each of the deleted bits remains outside. As illustrated, the original multiplication is 77 times 119. If all the bits shown are utilized, it will be observed that the multiplication product is the binary number equivalent to the decimal value 9,163. However, due to the rounding off of the number to the most significant bits, it is necessary that the fraction be used wherein the denominator is the maximum binary number usable for the number of bits used. Since only seven of the eight bits used are for numerical designation and the most significant bit is used for sign designation, the denominator is $2^7$ or 128. Using the same type of designation the answer using the total number of bits on line 19 is the fraction 9163/16384. However, using only the eight most significant bits, the answer is as shown 71/128. As may be ascertained by multiplying these numbers out, the total answer on line 19 results in a fraction having a decimal equivalent of 0.55926513. The fraction 71/128 is a number having a decimal equivalent of 0.5546875. While the two numbers are slightly different, they are close and may be increased in accuracy by increasing the number of bits in the applied multiplier and multiplicand words and accordingly increasing the size of the word storage means 26, 78, and 62.

Proceeding to multiplication problem 2 it will be noted that the only difference is that the J multiplicand value is changed to a negative number. This apparently causes a change in the answer as shown on line 19 since this is illustrated as −72/128. However, if all 15 of the bits realized in the multiplication are accounted for, the answer again becomes −9163/16384. This answer is, of course, a negative equivalent of the answer obtained in multiplication product 1. Thus, the fact that the truncated multiplication product in 2 has a different numerical value than that in multiplication 1 is merely due to the rounding off process. The truncated answer in multiplication 2 has a value of 0.562500. Again, this is not the exact equivalent of the exact product but is close enough for many purposes.

In examining the answers obtained in multiplication problems 3 and 4, it will be noted that the answer obtained in problem 3 is identical to that in problem 2 since in this case only one negative number is used although different from that used in multiplication problem 2 while in problem 4 both numbers are negative resulting in exactly the same answer as problem 1 using two positive numbers. This, of course, is in accordance with standard multiplication theories.

Applying the problems to the chart of FIG. 2, it will be noted that the number of line 1 in each of the multiplication problems may be found in row 44' of FIG. 2. Since the circuit is designed for the format of presenting the least significant bit first in time, the number in row 44 appears reversed. However, this should present no great problem in comparing the two multiplication processes and their cumulative product. The values or numbers on line 2 of the multiplication problems appear in row 24' but is only found in the column $N_0$. As will be explained later, the number found on line 24 continually changes due to the 7 bit shift register 26 and the circulating storage of this word. The digital numbers found on the even numbered lines of the multiplication problems between lines 4 and 18 are equivalent to those found in lines 48' of FIG. 2. The 8 bits (starting from the right) of the odd numbered lines of the multiplication problems between lines 5 and 19 thereof may be found in FIG. 2 in rows 52'. The 8 bits (starting from the left) of the odd numbered lines of the multiplication problems between lines 3 and 17 may be found in FIG. 2 in rows 80'. The extra digit shown on the odd numbered lines between 5 and 17 is supplied by circuitry comprising the JK flip-flop 82 and is introduced in the least significant bit time on leads 86 and 76 (shift register 78 input) during each word time. This may not be completely obvious without a thorough understanding of the invention.

One final comment with respect to the multiplication problem, if seven zeros were added to the right of the truncated answer of line 19 to replace the binary digits as illustrated, the resulting number would be a 15 digit number similar to that illustrated and would represent 9088/16384 and would have a decimal equivalent of 0.55468750 which is identical to the truncated answer of 71/128. This is believed to adequately illustrate that the method illustrated of rounding off the number by dropping the least significant bit obtained on each multiplication action in the cumulative process results in the same answer as would be obtained if the entire answer were first obtained and then the number truncated to the desired 8 bit value comprising the eight most significant bits.

OPERATION

As previously indicated, during the first time period or $N_0$ the input on lead 14 comprises all logic 1's This presents an effective logic 0 to NAND gate 16 and locks its output to a logic 1 condition. During the previous word time the sync bit input appearing on lead 22 is delayed in shift register 68 so that it affects the output of NAND gate 72 during the least significant bit (LSB) time of the $N_0$ word. However, during the remaining word time, NAND gate 72 is locked into an output logic 1 condition and thus the serial bit word appearing on lead 76 is logic 0 for all bits after the LSB during the first word time. As also shown, the input word I appears on lead 10 and since NAND gate 12 is activated by the input lead 14, logic 0 outputs appear from NAND gate 12 when a logic 1 input appears on lead 10. This is inverted in NAND gate 18 to produce a logic 1 on lead 24 to be applied to shift register 26. During all times other than sync bit times or MSB times, the output of NAND gate 20 is the inverse of the input. As will be determined, the application of signals on lead 22 to NAND gate 20 clears each digit to a logic 0 after the multiplication process so that at the beginning of each multiplication process the shift register 26 contains a plurality of logic 0's. Thus, the word appearing on lead 10 is entered into shift register 26. After 7 bit times or in other words at the time of the most significant bit, the incoming word commences appearing on output lead 28 as shown in FIG. 2 on line 28'. The application of a logic 1 on lead 22 and inverted to produce a logic 0 to the input of NAND gate 20 prevents return of this bit to the shift register 26. However, the application of a logic 1 from NAND gate 20 does allow the passage of any bits intended to be applied from lead 10. The bit appearing on lead 28, which 1, this case is a logic 1, is applied to JK flip-flop 30 and in coincidence with the sync bit applied on the clock input thereof produces a logic 1 output to be applied to gates 34 and 36. As will be noted, gates 34 and 36 have $N_0$ inputs so that gate 34 is activated only during $N_0$ word time and gate 36 is activated for the other seven word times of each frame. The application of a logic 1 to the input of flip-flop 30 causes a logic 1 to be applied to the plus input of multiplier 40 throughout the next word time. This allows the passage of the incoming word on line 44 to be supplied to the output of multiplier 40 on lead 48. If the lead 42 were activated instead, the output would be the logical inversion of the input plus a LSB of logic 1. This is explained further in the referenced patent application. At this time the number on line 4 of the first multiplication problem has been obtained and it is now time to add it to its previous cumulative product divided by 2. This is accomplished in summing circuit 50 where it is added to the zero output of shift register 78. The product is illustrated in the word column $N_1$ on row 52'. This product is then gated through NAND gates 16 and 74 and again supplied to the 7 bit shift register 78. At the MSB time of word $N_1$, the MSB of the J word on 44 and the cumulative product on line 52 is examined to see if they are both logic one or logic zero. If they are both a logic one, the JK flip-flop 82 is set at this most significant bit time and provided with an output of logic 1. However, this output logic 1 is not applied to lead 76 until the least significant bit time of word $N_2$. This delay occurs because of the 1 bit delay, in unit 68, of the actuating signal from the input lead 22. The signal on lead 70 deactivates NAND gate 16 and activates gate 72 so that lead 76 at the least significant bit time becomes a logic 1 after the first occurrence of simultaneous application of logic 1 from leads 52 and 44. This logic 1 condition occurs at the least significant bit time on lead 76 each word time thereafter until the termination of the multiplication process for that particular number or problem. The reason for the insertion of this logic 1 is to take care of the possibility that the number applied on lead 44 is a negative number and to thereby assure that the product obtained at the output after division by 2 in the shift register is indicative of that polarity. There are two instances, however, when the forcing of lead 76 to a logic 1 should not occur at the least significant bit time of word $N_2$. The first is the obvious condition where the digital word supplied on lead 10 is representative of the number zero. The not quite so obvious condition is where the first few least significant bits of the word supplied are logic 0's. In other words, a number such as 64/128 would not have a logic 1 until the 7th bit position. Thus, if a logic 1 were supplied on lead 76 for the first 6 bit positions the answer obtained at the output would be completely erroneous. However, by comparing the most significant bit positions on leads 52 and 44 for each of the multiplication product times, the logic 1 is inserted at the proper time.

Returning to the multiplication problem and word $N_2$, it will be noted that at the end of word time $N_1$ the second from the least significant bit of the input word I appears on lead 28 at the sync bit time. Thus, the JK flip-flop is now reset to this condition. Since the second bit is a logic 1 also, the JK flip-flop remains in the same condition. Again, the word from 44 is passed through the multiplier and added to a shifted version (division by 2) of the previous product. This may be ascertained from an examination of FIG. 2 and a comparison with problem 1 as illustrated. An examination of the I word as presented in 24' will indicate that the fourth bit is a logic 0. This appears in the MSB time of the word $N_3$ and is accordingly presented to the JK flip-flop so that it's output is now a logic 0 during word time $N_4$. Thus, the lead 38 is deactivated and the word appearing on lead 44 is not passed to lead 48. As may be observed from row 48' in FIG. 2, word time $N_4$, the word appearing on lead 48 is a plurality of 0's. However, this plurality of 0's, which corresponds to line 10 of the multiplication problem, is added to the previous product divided by 2 and a new cumulative product is obtained. Since the rest of the bit multiplications are obvious in view of the above, this explanation will skip to word $N_7$. At this time in the MSB position, a logic 0 appears on lead 28 thereby indicating that the I word is a positive number. Since this is a positive number, the JK flip-flop 30 will not be activated. However, during word time $N_0$, an attempt is made, via lead 14, to activate gate 34 rather than 36. Since no logic 1 appears at the output of JK flip-flop 30, there will be no passage of the word through multiplier 40.

Thus, a 0 is added to the previous accumulated product divided by 2 and supplied via the switch 54 to the shift register 62. This is applied after the signal on lead 14 moves the arm 58 to contact 56 and applies the input to shift register 62. Since the contact 60 is not connected to anything at that time, the previous word in shift register 62 is gated to the output thereof and lost. Then, for the next 7 word times the new word circulates therein.

Progressing briefly to problem 2 it will be noted that the input word J is negative. Thus, it will be further ascertained that at the MSB time of word $N_1$, the JK flip-flop 82 is activated due to the simultaneous occurrence of logic 1's on leads 52 and 44. This, of course, forces the lead 76 to a logic 1 in the LSB position of each following word. Due to the 7 bit delay in shift register 78, this logic 1 appears as the MSB of each of the following words which are added in summing means 50. The rest of the multiplication process follows the format outlined above in connection with multiplication problem 1.

Progressing to multiplication problem 3, it will be noted that in this instance the word I is a negative number. This has no effect on the circuit until the word time $N_7$. At this time a logic 1 appears on lead 28 in the most significant bit position and sets JK flip-flop 30 to provide a logic 1 output. As previously indicated, the $N_0$ input during word time 0 attempts to activate the gate 34 and deactivate gate 36. Thus, during the $N_0$ word time, a logic 1 is applied to lead 42. The application of a logic 1 on lead 42 to multiplier 40 will cause a logical inversion of the word supplied on lead 44 plus an LSB of logic 1. This word is shown in FIG. 2 in the second to the last major row of numbers in row 48'. This number is, of course, the same as found in line 18 of the problem 3 previously illustrated. This number is added to (effectively subtracted) from the previous cumulative product divided by 2 and thus provides the indicated negative answer.

It is believed that the final mathematical problem is obvious from the above explanations and it will be noted that again, due to the fact that the input word I on line 10 is a negative number, inversion of the J number on line 44 again occurs. However, the input word in this instance is already a negative word and thus it is inverted to a positive word on line 48 and thus is effectively added to the already accumulated sum divided by 2. This, of course, produces a positive resultant total as shown in line 19 of problem 4 and in row 52 of FIG. 2 under the second $N_0$ column.

As a summarization of the process utilized by the multiplier of FIG. 1 it will be noted that the word storage means 26 acts to provide a different bit of the incoming multiplier word to the multiplier 40 in each of a number of word times equivalent to number of bits in the incoming multiplier word. Further, as shown in the preferred embodiment, the multiplier and multiplicand words are identical in word length and the output product is also of the same length. This results in a truncation of the answer which is not as accurate as would be obtained by keeping all the bits. However, such truncation is a usual practice where many successive manipulations are to be made of a given digital number. Each bit from the incoming multiplier word is multiplied from the least significant bit towards the most significant bit times the incoming multiplicand word and after each individual multiplication the product thereof is added to the previous cumulative product divided by 2. The shifted cumulative product is forced to a negative number condition at the first occurrence of an indication that the multiplicand word is a negative number along with a simultaneous occurrence of a logic 1 in the multiplier number. This forcing of the shifted cumulative product to a negative number condition remains until the end of that particular multiplication problem. If the final bit of the multiplier is a logic 1, thereby indicating it is a negative number, the multiplicand is logically subtracted from the previous cumulative product divided by 2 to obtain the final answer. This logical subtraction is accomplished by inversion plus the LSB of logic 1 and adding but results in the same end result.

While I have shown a single embodiment of the invention, it is obvious that different word sizes may be utilized by merely expanding the capacity of the various shift registers 26, 78, and 62. Further, other circuits are available to accomplish the objectives of the present invention and following the general format as outlined above in the summary. Therefore, I wish to be limited not by the preferred embodiment shown but only by the scope of the appended claims wherein

I claim:

1. Serial data bit multiplying apparatus over a time period comprising a frame of words for each multiplication problem wherein a frame includes as many words as there are data bits in a multiplier word comprising, in combination:

input first means for supplying a serial data bit multiplier word signal representing a first number wherein the multiplier word signal comprises a plurality of bits ranging from a least significant bit (LSB) to a most significant bit (MSB) wherein the MSB is a sign bit for indicating the polarity of the number represented by the multiplier word;

input second means for supplying a serial data bit multiplicand word signal representing a number which also comprises a plurality of bits ranging from an LSB to a MSB with the MSB being a sign bit representing the polarity of the number represented by the multiplicand word;

third means, including input means and output means, connected to said first and second means for examining the individual bits in the multiplier word starting with the least significant bit and examining only one bit per word time in the frame and passing the multiplicand word to the output means thereof upon each occurrence of a data bit in the multiplier signal of a first logic value;

cumulative adding fourth means connected to the output of said third means for receiving digital words supplied at the output thereof and adding these to a representation of the product obtained in a given frame;

output fifth means connected to said fourth means for retrieving the total time shifted data bit cumulatively added product representing the digital product of the multiplier and multiplicand signals at the end of each frame; and sign detection sixth means connected to each of said second means and said fourth means for detecting logic values of signals received therefrom and for forcing the MSB of said representation of the product to be added to the most recently received word from said third means, to said first logic value for each word time remaining in a given frame after detection of said first logic value in the most significant bit position of both of the signals received from said second and fourth means.

2. Serial data bit multiplying apparatus over a time period comprising a frame of words for each multiplication problem wherein a frame includes as many words as there are data bits in a multiplier word comprising, in combination:

input first means for supplying a serial data bit multiplier word signal representing a first number wherein the multiplier word signal comprises a plurality of bits ranging from a least significant bit (LSB) to a most significant bit (MSB) wherein the MSB is a sign bit for indicating the polarity of the number represented by the multiplier word;

input second means for supplying a serial data bit multiplicand word signal representing a number which also comprises a plurality of bits ranging from an LSB to a MSB with the MSB being a sign bit representing the polarity of the number represented by the multiplicand word;

third means, including input means and output means, connected to said first and second means for examining the individual bits in the multiplier word starting with the least significant bit and examining only one bit per word time in the frame and passing the multiplicand word to the output means thereof upon each occurrence of a data bit in the multiplier signal of a first logic value, and further including word storage means for a total bit capacity which is one data bit less than the number of data bits in the multiplier word and further storage means, connected to said word storage means, for receiving outputs therefrom and for providing an output representative of the data bit appearing at the output of said first word storage means at the MSB time of each word of the frame for the time duration of the word following the appearance of said data bit at said MSB.

cumulative adding fourth means connected to the output of said third means for receiving digital words supplied at the output thereof and adding these to a representation of the product obtained in a given frame; and output fifth means connected to said fourth means for retrieving the total time shifted data bit cumulatively added product representing the digital product of the multiplier and multiplicand signals at the end of each frame.

3. Serial data bit multiplying apparatus over a time period comprising a frame of words for each multiplication problem wherein a frame includes as many words as there are data bits in a multiplier word comprising, in combination:

input first means for supplying a serial data bit multiplier word signal representing a first number wherein the multiplier word signal comprises a plurality of bits ranging from a least significant bit (LSB) to a most significant bit (MSB) wherein the MSB is a sign bit for indicating the polarity of the number represented by the multiplier word;

input second means for supplying a serial data bit multiplicand word signal representing a number which also comprises a plurality of bits ranging from an LSB to a MSB with the MSB being a sign bit representing the polarity of the number represented by the multiplicand word;

third means, including input means and output means, connected to said first and second means for examining the individual bits in the multiplier word starting with the least significant bit and examining only one bit per word time in the frame and passing the multiplicand word to the output means thereof upon each occurrence of a data bit in the multiplier signal of a first logic value;

cumulative adding fourth means connected to the output of said third means for receiving digital words supplied at the output thereof and adding these to a representation of the product obtained in a given frame, said fourth means comprising word storage means having a capacity equal to one bit less than the multiplicand word, and adding means connected from an output to an input of the word storage means in a feedback manner whereby the word fed back is truncated before being added to any words supplied to said fourth means by said third means; and output fifth means connected to said fourth means for retrieving the total time shifted data bit cumulatively added product representing the digital product of the multiplier and multiplicand signals at the end of each frame.

4. Serial data bit multiplier means comprising, in combination:

first signal input means for supplying a serial data bit multiplier word having a given number of bits ranging from an LSB to a MSB wherein the MSB is a sign bit indicating the polarity of the number represented by the multiplier word;

second signal input supplying means for supplying a multiplicand serial data bit digital word comprising said given number of bits ranging from an LSB to a MSB with the MSB signifying the polarity of the number represented by the multiplicand word;

third signal supplying means for supplying an input word during the first word of a frame of words wherein the number of words in a frame is equal to said given number of data bits in a word;

fourth signal supplying means for supplying a logical input signal at the MSB time of each word;

first NAND gate means connected to receive said signals from first and third signal supplying means and supplying an output representative thereof;

second NAND gate means connected to receive an inverted version of the signal from said fourth signal supplying means and including a further input and an output for supplying signals representative of signals supplied to inputs thereof;

third NAND gate means connected to said first and second NAND gate means for receiving output signals therefrom, said third NAND gate means supplying an output signal representative of those signals supplied to the inputs thereof;

first word storage means including input means and output means, the input means being connected to said third NAND gate means for receiving the output signal therefrom the storage capacity of said first word storage means being one data bit less than said given number of bits in the multiplier word supplied by said first means;

first JK flip-flop means including J, inverted K, and clock input means and true output means;

means connecting the output of said first word storage means to the further input of said second NAND gate means, to said J and inverted K inputs of said JK flip-flop means;

means supplying the signal from said fourth signal supplying means to the clock input of said JK flip-flop means;

first and second AND gate means each including first and second inputs and an output;

means connected said true output of said first JK flip-flop means to the first input of each of said first and second AND gate means;

means connecting the signal from said third signal supplying means to said second input of said second AND gate means and supplying an inverted version of the signal from said third signal supplying means to said second input of said first AND gate means;

multiplying means including a first input connected to said second signal supplying means and further means connected to the outputs of said first and second AND gate means, said multiplying means also including output means, the signal appearing on said output means being identical to that received at said first input means if a given signal is received from said first AND gate means and being a logical inversion thereof plus an LSB of logic 1 if a said given signal is received from said second AND gate means;

summing means including a first input connected to the output of said multiplying means, a second input and an output, the output of said summing means representing the additive product of the signals received on first and second inputs;

third AND gate means, including first and second inputs connected to said second signal supplying means and to the output of said summing means for receiving signals therefrom, said third AND gate means also including an inverted third input connected to said third signal supplying means and including an output;

second JK flip-flop means including a J input connected to the output of said third AND gate means, a K input connected to said third signal supplying means, a clock input connected to said fourth signal supplying means and a true output;

fourth NAND gate means including a first regular input, second and third inverted inputs and an output;

second storage means for delaying input signals by one data bit time and including an input connected to said fourth signal supplying means and further including an output connected to said inverted second input of said fourth NAND gate means;

means connecting the output of said summing means to said first input of said fourth NAND gate means and connecting the output of said third signal supplying means to said third inverted input of said fourth NAND gate means;

fifth NAND gate means including first and second input means and an output means, said first input means of said fifth NAND gate means being connected to said output of said second word storage means and said second input thereof being connected to said true output of said second JK flip-flop means;

sixth NAND gate means including first and second inputs connected to the outputs of said fourth and fifth NAND gate means and including an output;

third word storage means, having a data bit capacity of one less than said given number of bits in a word, connected between the output of said sixth NAND gate means and said second input of said summing means; and apparatus output means connected to said output of said summing means for supplying a word at the end of each frame of words representative of the product of said multiplier and said multiplicand words supplied by said first and second signal input means.

* * * * *